United States Patent
Schauls

[15] 3,669,186
[45] June 13, 1972

[54] DISTRIBUTOR FOR PLATE TYPE HEAT EXCHANGERS HAVING END HEADERS

[72] Inventor: James J. Schauls, La Crosse, Wis.
[73] Assignee: The Trane Company, La Crosse, Wis.
[22] Filed: Dec. 10, 1969
[21] Appl. No.: 883,840

[52] U.S. Cl. .................................................. 165/166
[51] Int. Cl. .................................................. F28f 3/00
[58] Field of Search .................................... 165/166

[56] References Cited

UNITED STATES PATENTS 3,282,334  11/1966  Stahlheber ............................. 165/166
3,380,517  4/1968  Butt ........................................ 165/166

FOREIGN PATENTS OR APPLICATIONS 528,087  7/1956  Canada .................................... 165/166

Primary Examiner—Carroll B. Dority, Jr.
Attorney—Arthur O. Andersen and Carl M. Lewis

[57] ABSTRACT

A plate type heat exchanger having a corrugated fin fluid distributor particularly adapted for use with end headers is shown. The distributor length is a function of the passage width, port width, and characteristics of the distributor fin material by which substantially uniform heat exchange fluid distribution across the width of a plate type heat exchanger passage is obtained.

4 Claims, 3 Drawing Figures

PATENTED JUN 13 1972          3,669,186

INVENTOR.
JAMES J. SCHAULS

BY  *Carl M. Lewis*

ATTORNEY

DISTRIBUTOR FOR PLATE TYPE HEAT EXCHANGERS HAVING END HEADERS

To obtain uniform flow distribution in the passage of a heat exchanger, the pressure loss through all flow paths in the passage must be equal. To achieve this equality general design procedures call for substantially identical distributors connected to inlet and outlet headers on opposite corners or opposite sides of a plate type heat exchanger core. Thus, even through the pressure drop of various flow paths through one distributor is not equal, the difference is balanced by the other distributor. However, in order for this balancing effect to be effective, each distributor must be able to sense the performance of the other distributor. In other words, the lateral pressure gradient that exists just downstream of the inlet distributor must be transmitted without distortion to the outlet distributor. No lateral fluid flow may occur in the span between the distributors as this will change the pressure gradient and consequently the fluid flow distribution. When the heat exchanger flow passage length exceeds its width by more than a factor of about 6 where serrated or otherwise perforated corrugated fins are used, the fluid distribution is critical and it is important that the individual distributors present equal pressure drops for all the flow paths therethrough.

It is thus an object of this invention to provide a fluid distributor for plate type heat exchangers having end ports which distributor is capable of imparting substantially the same pressure drop to each of the flow paths therethrough.

It is a further object of this invention to provide a fluid distributor for plate type heat exchangers having end ports in which the fluid distributor provides substantially uniform distribution of the fluid across the width of the heat exchanger passage.

And it is still a further object of this invention to provide a plate type heat exchanger with inlet and outlet fluid distributors which are each individually capable of providing uniform fluid distribution which may operate entirely independently of each other and therefore independently of a function of the length of the heat exchanger passage.

It is a further object of this invention to shape a heat exchanger distributor for meeting the above described objectives in terms of the heat exchanger flow passage dimensions and the flow imparting characteristics of the distributor fin material per se.

Other objects and advantages will become apparent as this specification proceeds to describe the invention with reference to the accompanying drawings in which.

Figure 3:
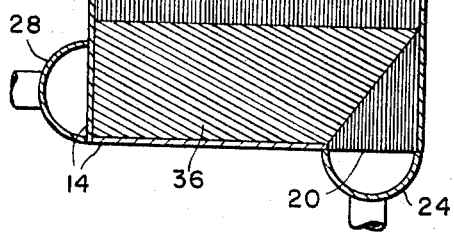
FIG. 3 is a component of the heat exchanger of FIG. 1 shown on a reduced scale.

Referring now to the drawings, it will be seen that heat exchanger 10 has a plurality of rectangular plates 12 of generally similar peripheral configuration contraposed in spaced parallel relationship. The length of each plate 12 exceeds its width by a factor of more than six as shown in FIG. 3. The relatively thin spaces between plates 12 are sealingly enclosed by a series of closing bars 14 sealingly brazed to plates 12 at the peripheral margins thereof to thereby define a plurality of relatively thin rectangular flow passages intermediate plates 12. Certain of the flow passages 16 are provided with inlet and outlet ports 18 and 20 for passage of a first heat exchange fluid through the heat exchanger core from end inlet header 22 to end outlet header 24. Other of the passages 26 have side inlet and outlet ports which appropriately communicate with side inlet and outlet headers 28 and 30 respectively.

Figure 1:
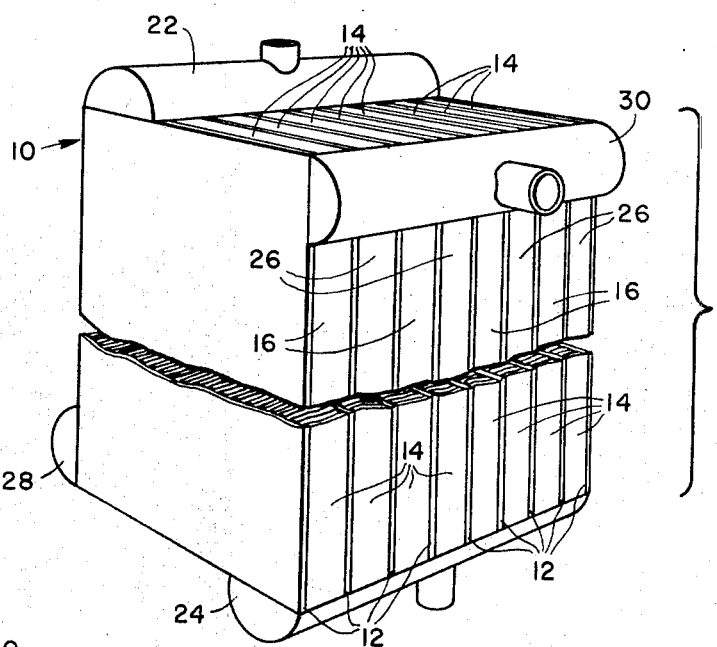
FIG. 1 is a perspective of a plate type heat exchanger embodying the instant invention.
Figure 2:
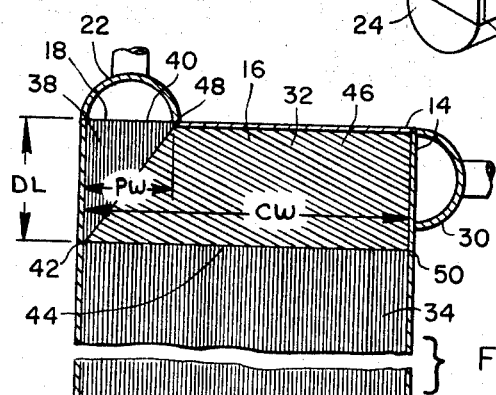
FIG. 2 is a section taken through one of the passages of the heat exchanger FIG. 1 showing the distributor structure therein.

Now with specific reference to FIG. 2, it will be seen that passage 16 is divided into an inlet distributor section having a length DL, a heat transfer section 34, and an outlet distribution section 36. Throughout this specification and the accompanying claims length is considered a dimensional quantity measured parallel to the longitudinal axis of the heat exchanger core, width the dimensional quantity measured parallel to plates 12 and normal to the longitudinal axis of the heat exchanger core, and thickness the dimensional quantity measured normal to plates 12 and normal to the longitudinal axis of the heat exchanger core.

Distributor section 32 includes a port portion 38 having triangular configuration of corrugated fin material such as shown in FIG. 9 of U.S. Pat. No. 3,282,334. The phrase "fin material" per se as used through this specification and claims refers to the kind of material i.e. polished aluminum of a given thickness; the type of fin i.e. straight, herringbone, porous, serrated; and the dimensional values of fin height and spacing. One edge of triangular portion 38 abuts and extends along the face 40 of port 18 for a distance PW equal to the port width. The crests and valleys of the corrugated fin material of portion 38 are perpendicular to the face of port 18. Triangular portion 38 extends into passage 16 so that the apex 42 coincides with a plane 44 normal to the longitudinal axis of the heat exchanger core and spaced a distance DL from the inlet end of passage 16 as indicated.

The distributor 32 also includes a second portion 46 of corrugated fin material similar to that shown in FIG. 11 of U.S. Pat. No. 3,282,334 which distributes the fluid passing from portion 38 across the width CW of passage 16. The crests and valleys of the corrugated fin material of second portion 46 extend parallel to a line joining the inner edge 48 of port face 40 to a point 50 at the intersection of plane 44 with that the side of the heat exchanger core remote from the portion 38 of distributor 32.

The corrugated fin portions 38 and 46 are brazed bonded along their crests and valleys to the adjacent plates 12 which enclose passage 16 whereby the fin material spanning between the crests and valleys along with plates 12 define a plurality of adjacent parallel conduits or flow paths for distributing the heat transfer fluid. These conduits have a hydraulic diameter D which may be defined as four times the flow cross sectional area divided by the wetted perimeter. The hydraulic diameter may be thus calculated for any corrugated fin structure. Furthermore for any given corrugated fin structure, a free area factor Ac may be determined. As used herein the free area factor or coefficient is expressed in square feet of flow area per inch of fin material measured along a line parallel to plates 12 and normal to the crests and valleys of the corrugated fin material. The hydraulic diameter and free area factor thus are values which may be determined directly by dimensional measurement of the fin structure.

A third fin material parameter used herein, $f$, is the drag friction coefficient which must be determined by tests, for each fin structure. The drag friction coefficient may be expressed as $$\frac{D\Delta P}{4L(VH)}$$

where D is the above described hydraulic diameter, (VH) fluid flow velocity head, L is the length of the flow path and $\Delta P$ is the pressure drop experienced by test.

The hydraulic diameter, free area factor, and drag friction coefficient are expressions all well known and understood by those having skill in the art of fluid flow. Values for these expressions may be easily determined for any corrugated fin material.

Now in order to provide a distributor fin structure wherein the pressure drop of each of the flow paths through the distributor is substantially the same, it is necessary to relate the dimensions of the distributor portions 38 and 46 to the dimensional and friction characteristics of the fin material of portions 38 and 46. This relationship is as follows.

$$DL = \frac{CW - PW}{\left[K \cdot 715 \left(\frac{CW}{PW}\right) 1.29 - 1\right]^{1/2}}$$

where $$K = \phi \left(\frac{D_2}{D_1}\right)^{1.2} \left(\frac{Ac_2}{Ac_1}\right)^{1.8}$$

where
- $D_1$ = the effective hydraulic diameter in feet for the fin material of said first portion;
- $D_2$ = the effective hydraulic diameter in feet for the fin material of said second portion;
- $Ac_1$ is the effective free area factor for the fin material of the first portion;
- $Ac_2$ is the effective free area factor for the fin material of the second portion;
- $\phi = f_1/f_2$ where $f_1$ and $f_2$ respectively are the effective drag friction coefficients for the fin material at any common Reynolds number in the turbulent flow range for said first and second portions.

It should be appreciated that each of portions 38 and 46 may be comprised of plural pieces. In such case, it is necessary to determine the effective values of the hydraulic diameter, free area factor and friction coefficient of the combination of pieces. If all the pieces for a portion are of the same fin material, such a determination for such portion is unnecessary.

A plate type heat exchanger fluid distributor for an end port of the type herein described will provide substantially uniform distribution of the heat exchanger fluid from the face of the inlet port across the width of the heat exchanger passage. In the alternative the same distributor structure will provide uniform collection of fluid from the full width of the heat exchanger passage and direct it uniformly across the face of the outlet port. Thus the same principles used in structuring the inlet distributor section 32 may be used in structuring the outlet distributor 36.

It is understood that the above described embodiment is illustrative of the principles of the present invention. Numerous and varied other embodiments could be devised in accordance with these principles by those skilled in the art without departing from the spirit and scope of the invention.

What I claim is:

1. An elongated plate type heat exchanger core comprising: a plurality of plates of similar generally rectangular peripheral configuration contraposed in spaced substantially parallel relationship wherein the distances between adjacent plates individually are substantially less than the width of said plates thereby defining a plurality of relatively thin spatial layers therebetween; sealing means sealingly bridging between and extending along the margins of adjacent plates whereby said spatial layers are enclosed to define a plurality of elongated passages each having a thickness less than its width and a width less than its length; means defining a port having a face substantially normal to the longitudinal axis of said core communicating with one of said passages; a corrugated fin fluid distributor disposed in said one passage between said port face and a plane substantially normal to said longitudinal axis traversing said core; said distributor including a first generally triangular port portion of corrugated first fin material having an edge of its triangular configuration abutting said port face and the apex opposite said edge coinciding with said plane and at least a second portion of corrugated second fin material disposed in said passage laterally of said first triangular port portion between said plane and said first portion wherein the relationship between the width of said one passage in inches CW, the width of said port face in inches PW, and the distance between said port face and said plane in inches DL is substantially as follows:

$$DL = \frac{CW - PW}{\left[ K \cdot 715 \left( \frac{CW}{PW} \right) 1.29 - 1 \right]^{1/2}}$$

where $$K = \phi \left( \frac{D_2}{D_1} \right)^{1.2} \left( \frac{Ac_2}{Ac_1} \right)^{1.8}$$

where
- $D_1$ = the hydraulic diameter in feet for the fin material of said first portion;
- $D_2$ = the hydraulic diameter in feet for the fin material of said second portion;
- $Ac_1$ is the free area factor for the fin material of the first portion;
- $Ac_2$ is the free area factor for the fin material of the second portion;
- $\phi = f_1/f_2$ where $f_1$ and $f_2$ respectively are the drag friction coefficients for the fin materials of said first and second portions at a common Reynolds number in the turbulent flow range.

2. The apparatus as defined by claim 1 wherein the length of said one passage exceeds its width by a factor in excess of 6.

3. An elongated plate type heat exchanger core comprising: a plurality of plates of similar generally rectangular peripheral configuration contraposed in spaced substantially parallel relationship wherein the distances between adjacent plates individually are substantially less than the width of said plates thereby defining a plurality of relatively thin spatial layers therebetween; sealing means sealingly bridging between and extending along the margins of adjacent plates whereby said spatial layers are enclosed to define a plurality of elongated passages each having a thickness less than its width and a width less than its length; means defining a port having a face substantially normal to the longitudinal axis of said core communicating with one of said passages; a corrugated fin fluid distributor disposed in said one passage between said port face and a plane substantially normal to said longitudinal axis traversing said core; said distributor including a first generally triangular port portion of corrugated first fin material having an edge of its triangular configuration abutting said port face and the apex opposite said edge coinciding with said plane and at least a second portion of corrugated second fin material disposed in said passage laterally of said first triangular port portion between said plane and said first portion wherein the relationship between the width of said one passage in inches CW, the width of said port face in inches PW, and the distance between said port face and said plane in inches DL is as follows:

$$DL = \frac{CW - PW}{\left[ K \cdot 715 \left( \frac{CW}{PW} \right) 1.29 - 1 \right]^{1/2}}$$

where $$K = \phi \left( \frac{D_2}{D_1} \right)^{1.2} \left( \frac{Ac_2}{Ac_1} \right)^{1.8}$$

where
- $D_1$ = the effective hydraulic diameter in feet for the fin material of said first position;
- $D_2$ = the effective hydraulic diameter in feet for the fin material of said second portion;
- $Ac_1$ is the effective free area factor for the fin material of the first portion;
- $Ac_2$ is the effective free area factor for the fin material of the second portion;
- $\phi = f_1/f_2$ where $f_1$ and $f_2$ respectively are the effective drag friction coefficients for the fin materials of said first and second portions at a common Reynolds number in the turbulent flow range.

4. The apparatus as defined by claim 3 wherein the length of said one passage exceeds its width by a factor in excess of 6.

* * * * *

UNITED STATES PATENT OFFICE
CERTIFICATE OF CORRECTION

Patent No. 3,669,186                Dated June 13, 1972

Inventor(s) James J. Schauls

It is certified that error appears in the above-identified patent and that said Letters Patent are hereby corrected as shown below:

Column 2, line 70, column 3, line 65 and column 4, line 45, the formulas, each occurrence, should appear as shown below:

$$DL = \frac{CW - PW}{[K\ {}^{.715}\frac{CW}{PW}\ {}^{1.29} - 1]^{1/2}}$$

Signed and sealed this 1st day of May 1973.

(SEAL)
Attest:

EDWARD M. FLETCHER, JR.
Attesting Officer

ROBERT GOTTSCHALK
Commissioner of Patents